United States Patent
Prasad et al.

(10) Patent No.: US 6,453,279 B1
(45) Date of Patent: Sep. 17, 2002

(54) STATISTICAL TREND GENERATOR FOR PREDICTIVE INSTRUMENT MAINTENANCE

(75) Inventors: Mohan Prasad, Mansfield; David N. DeMoura, Taunton, both of MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/434,980

(22) Filed: Nov. 5, 1999

(51) Int. Cl.$^7$ ................................................. G05B 9/02
(52) U.S. Cl. .................. 703/189; 702/189; 702/116; 702/104; 702/183; 714/736
(58) Field of Search ................................ 702/189, 116, 702/179, 191, 60, 183, 77; 376/215, 216, 217; 73/24.01, 25.03; 714/736, 30, 745, 737, 799

(56) References Cited

U.S. PATENT DOCUMENTS

| | | | |
|---|---|---|---|
| 4,366,544 A | 12/1982 | Shima et al. ............... 364/550 |
| 4,455,875 A | 6/1984 | Guimard et al. ............. 73/708 |
| 4,607,530 A | 8/1986 | Chow ............................. 73/708 |
| 4,885,707 A | 12/1989 | Nichol et al. .......... 364/551.01 |
| 4,936,147 A | 6/1990 | Eernisse et al. .............. 73/702 |
| 5,210,704 A | 5/1993 | Husseiny ............... 364/551.01 |
| 5,251,151 A | 10/1993 | Demjanenko et al. ...... 364/550 |
| 5,311,562 A | 5/1994 | Palusamy et al. ........... 376/215 |
| 5,315,876 A | 5/1994 | Glassey et al. ............... 73/708 |
| 5,459,675 A * | 10/1995 | Gross et al. ................. 376/215 |
| 5,548,597 A * | 8/1996 | Kayama et al. ............... 714/30 |
| 5,596,507 A | 1/1997 | Jones et al. ................. 364/505 |
| 5,597,020 A | 1/1997 | Miller et al. .................. 141/95 |
| 5,623,426 A | 4/1997 | Ozawa et al. ............... 364/557 |
| 5,629,872 A * | 5/1997 | Gross et al. ................. 702/116 |
| 5,680,409 A * | 10/1997 | Qin et al. ..................... 702/116 |
| 5,710,723 A | 1/1998 | Hoth et al. ............. 364/551.01 |
| 5,729,474 A | 3/1998 | Hildebrand et al. ........ 364/557 |
| 5,804,696 A | 9/1998 | Seberger et al. ............. 73/1.59 |
| 5,808,903 A | 9/1998 | Schiltz et al. ............... 364/508 |
| 5,828,567 A | 10/1998 | Eryurek et al. ............. 364/184 |
| 5,867,809 A | 2/1999 | Soga et al. ................. 702/130 |
| 6,016,465 A * | 1/2000 | Kelly ........................... 376/215 |

FOREIGN PATENT DOCUMENTS

| | | |
|---|---|---|
| DE | 44 36 658 | 10/1994 |
| WO | WO 94/28557 | 12/1994 |
| WO | WO 97/03385 | 1/1997 |

* cited by examiner

Primary Examiner—John S. Hilten
Assistant Examiner—Hien Vo
(74) Attorney, Agent, or Firm—Kevin A. Oliver; Foley Hoag LLP

(57) ABSTRACT

A method for adaptively scheduling maintenance of a sensor (14) infers the need for maintenance of that sensor on the basis of an error signal indicative of a difference between a measurement signal generated by that sensor and an independently obtained reference signal that is correlated with the measurement signal (16). Although the reference signal is not identical to the measurement signal, the correlation between these two signals assures that when the sensor is functioning, the two signal will track each other over time. The method includes the step of generating this error signal and then monitoring that error signal to detect a triggering event indicative of a mismatch between the reference signal and the measurement signal. This mismatch is indicative of a probability that there exists a malfunction in the sensor. The value of this probability depends on the choice of the triggering event.

28 Claims, 7 Drawing Sheets

STATISTICAL TREND GENERATOR FOR PREDICTIVE INSTRUMENT MAINTENANCE

TECHNICAL FIELD OF THE INVENTION

This invention relates to the field of scheduled maintenance in a process control system and, in particular, to a method and system for determining, on the basis of its performance, whether a system component requires maintenance.

BACKGROUND

In a process control system, a controller typically sets the value of one or more manipulated variables with the objective of maintaining the value of a controlled variable at a specified setpoint. For example, a controller can maintain a fluid level (the controlled variable) in a tank, by altering the flow rates (the manipulated variables) of fluid entering and/or leaving the tank. Since the appropriate value of the manipulated variable typically depends on the value of the controlled variable, a process control system almost invariably includes a measurement sensor for monitoring the value of the controlled variable.

The correct operation of the measurement sensor is of paramount importance in the operation of a process control system. It is easy to see, in the foregoing example, that a measurement sensor that under-represents the fluid level can cause the controller to increase the flow rate into the tank, thereby causing the tank to flood. It is thus desirable, in a process control system, for measurement sensors to function with utmost reliability.

Because of the nature of its function, a measurement sensor is typically in intimate contact with the process under control. In many cases, this results in exposure of the measurement sensor to extremes of pressure and temperature in the presence of corrosive fluids. In some cases, the mechanical agitation used to mix process constituents results in prolonged vibration of the measurement sensor. Indeed, the environment faced by a measurement sensor in its day-to-day operation can be more hostile than that faced by interplanetary probes.

Given the cumulative effect of the conditions under which they operate, it is not surprising that even the most rugged measurement sensors require periodic maintenance to assure their optimal functioning. This periodic maintenance generally entails shutting down the process and testing the operation of the measurement sensor. The loss of production time resulting from shutting down the process makes it desirable to avoid unnecessary maintenance of the measurement sensor.

What is difficult to determine, however, is when the periodic maintenance should occur. Periodic maintenance that occurs more frequently than necessary is economically wasteful. However, periodic maintenance that is too infrequent can lead to catastrophe. Because the maintenance requirements of a particular measurement sensor depend on its cumulative exposure to wear, it is difficult to predict with certainty when failure is likely to occur.

A particular difficulty with accounting for a measurement sensor's cumulative exposure to wear is that, in some cases, the variable that the measurement sensor measures, is itself one of the factors contributing to wear on the measurement sensor. If, as is often the case, exposure of the measurement sensor to a hostile environment gradually reduces the accuracy of the sensor measurement, and if one is also relying on that sensor's measurements to predict the need for maintenance of that sensor, then one's predictions can be flawed.

For example, in order to determine when a pressure sensing device might need replacement, one can monitor the performance of the pressure sensing device. However, it is not generally possible to determine whether the measured pressure is the actual pressure, in which case the device is working correctly, or whether the measured pressure and the actual pressure differ, in which case the device may need maintenance. This poses a bootstrapping quandary, since the only way to know the actual pressure is to read the measured pressure using the very pressure sensing device whose accuracy is in question.

It is not a satisfactory solution to provide two measurement sensors since any discrepancy would simply indicate that at least one of the two sensors is unreliable without specifying which it is. Although additional measurement sensors could be provided, this would dramatically increase equipment costs.

SUMMARY

A system incorporating the principles of the invention determines the probability that a measurement sensor, which generates a measurement signal, requires maintenance. The system includes a reference sensor adapted to generate a reference signal that is at least partially correlated with the measurement signal generated by the measurement sensor. This reference signal, together with the measurement signal generated by the measurement sensor, are provided to an error signal generator that generates, from the measurement signal and the reference signal, an error signal. A trend spotter, in communication with the error signal generator, monitors the error signal to detect the occurrence of a triggering event. This triggering event is pre-selected to be indicative of the probability that the measurement sensor requires maintenance.

The method of the invention infers the probability that a measurement sensor requires maintenance on the basis of an error signal indicative of a difference between a measurement signal generated by that sensor and an independently obtained reference signal that is correlated with, but distinct from, the measurement signal. Although the reference signal is not identical to the measurement signal, the correlation between these two signals assures that when the sensor is functioning correctly, the two signals track each other over time. The method of the invention monitors this error signal to detect a triggering event indicative of a mismatch between the reference signal and the measurement signal. The occurrence of the triggering event is indicative of a probability of a malfunction in the sensor and hence indicates a need for maintenance.

A "triggering event" is intended to include composite events formed by unions and intersections of events. For example, a triggering event can be that the reference signal and the measurement signal differ by more than a selected threshold. A triggering event can also be the event that the reference signal and the measurement signal differ by more than a selected threshold a pre-selected number of times during a pre-selected interval. In both cases, the triggering event is indicative of the probability that the measurement sensor is malfunctioning. By suitably defining the triggering event, the method of the invention reduces the likelihood that spurious differences between the measurement signal and the reference signal incorrectly indicate a need for maintenance.

The step of generating the error signal includes the step of generating a difference signal representative of the difference between the reference signal and the measurement signal. This is followed, in one embodiment, by the step of rectifying, or evaluating the absolute value of, the difference signal. The absolute value of the difference signal, also referred to as the "rectified difference signal," is then monitored to determine the extent to which it deviates from a constant value.

In another embodiment, the error signal is generated by passing the difference signal in parallel through two different first-order filters having different time constants. The outputs of these two first-order filters are then subtracted from each other and the resulting difference is used to generate the error signal. To the extent that the difference between the outputs of these two filters is close to zero, the method of the invention reports that the measurement sensor is functioning correctly. In this embodiment, a relatively constant non-zero or monotonically changing value indicates that one of the two inputs generating the difference signal is steadily moving away from the second input as a function of time.

In yet another embodiment, the error signal is the time rate-of-change of the rectified difference signal. This error signal is monitored to determine whether its value remains substantially equal to zero. To the extent that its value remains substantially equal to zero, the method of the invention reports that the measurement sensor is functioning correctly.

In another embodiment, the error signal is a cumulative sum of the time-derivative of the rectified difference signal. This error signal is monitored to determine whether its value remains substantially zero. To the extent that the error signal remains substantially zero, the method of the invention reports that the measurement Sensor is functioning correctly.

These and other advantages and features of the invention will be apparent from an examination of the detailed description and the accompanying drawings in which.

DESCRIPTION OF ILLUSTRATED EMBODIMENTS

Figure 1:
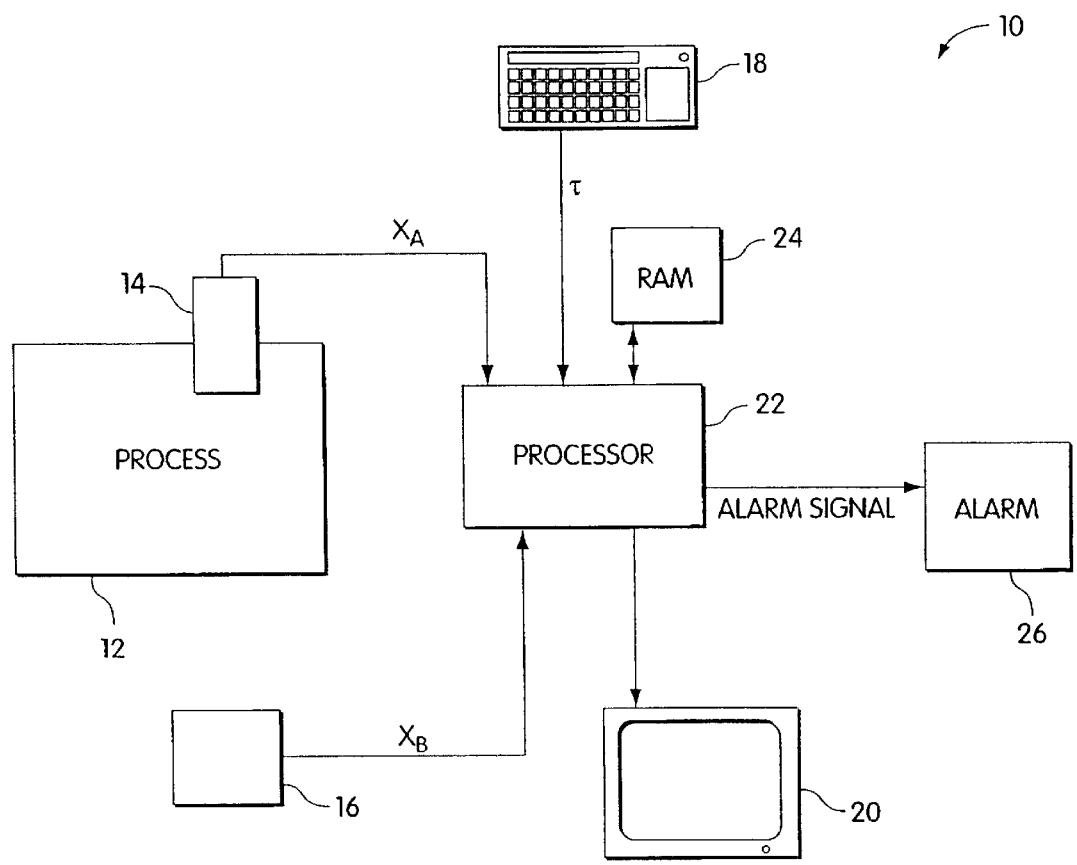
FIG. 1 is a block schematic representation of a process control system for carrying out the method of the invention.

A process control system 10 incorporating principles of the invention includes a process tank 12 having a parameter to be measured by a measurement sensor 14 in communication with the process tank 12. The measurement sensor 14 generates a measurement signal $x_a$ that, in a properly functioning measurement sensor 14, is indicative of the value of the parameter to be measured. This measurement signal is provided to a processor 22 in communication with the measurement sensor 14.

The processor 22 is in data communication with an input device 18 from which it obtains instructions from a user or from a programmed controller. Among these instructions is the value of a threshold $\tau$ whose function will be described below in connection with the discussion of the architecture and operation of software executed by the processor 22. The input device 18 is typically a keyboard, a mouse, or a combination of a keyboard and a mouse. However, the implementation of the invention does not depend on the manner in which the processor 22 obtains instructions. Indeed, it is possible for instructions to be hardwired into the processor 22, so as to bypass the need for an input device 18.

The processor 22 is also in data communication with a memory element 24 for storing software instructions to be executed by the processor 22. The memory element 24 is typically a random access memory of conventional design. However, the implementation of the invention does not depend on the manner or the location in which software instructions are physically stored.

In the preferred embodiment, a monitor 20 or other output device, for example a printer, is in data communication with the processor 22 so as to enable system maintenance personnel to review the output of the processor 22.

The process control system 10 also includes a reference sensor 16, typically removed the process tank 12 to be isolated from the parameter to which the measurement sensor 14 is exposed, and in communication with the processor 22. The reference sensor 16 produces a reference signal $x_b$ that is correlated with the measurement signal when the measurement sensor 14 is operating correctly. For example, if the parameter to be measured is temperature, then the ambient temperature outside, but proximate to, the process tank 12, which is measured by the reference sensor 16, is likely to be correlated with the actual temperature within the process tank 12, which is measured by the measurement sensor 14. This correlation can arise from heat being conducted from inside the process tank 12 and into the neighboring airspace surrounding the process tank 12.

Because the reference sensor 16 is removed from the process tank 12, it is not exposed to the hostile conditions found within the process tank 12. Hence, its reliability is expected to be greater than that of the measurement sensor 14. Because the value of the reference signal is a function of the measurement signal, the reference signal and the measurement signal are said to be "correlated." Because these signals are correlated, they track each other over time. Hence, an error signal indicative of the difference between the measurement signal and the reference signal can monitor the operation of the measurement sensor 14.

In operation, the processor 22 generates an error signal indicative of the difference between the measurement signal and the reference signal evaluated at successive times. By monitoring this error signal over time, the processor 22 determines whether the accuracy of the measurement signal is likely to be decreasing. Any deterioration in the accuracy of the measurement signal is then reported to indicate that the measurement sensor 14 may need maintenance.

Figure 2:
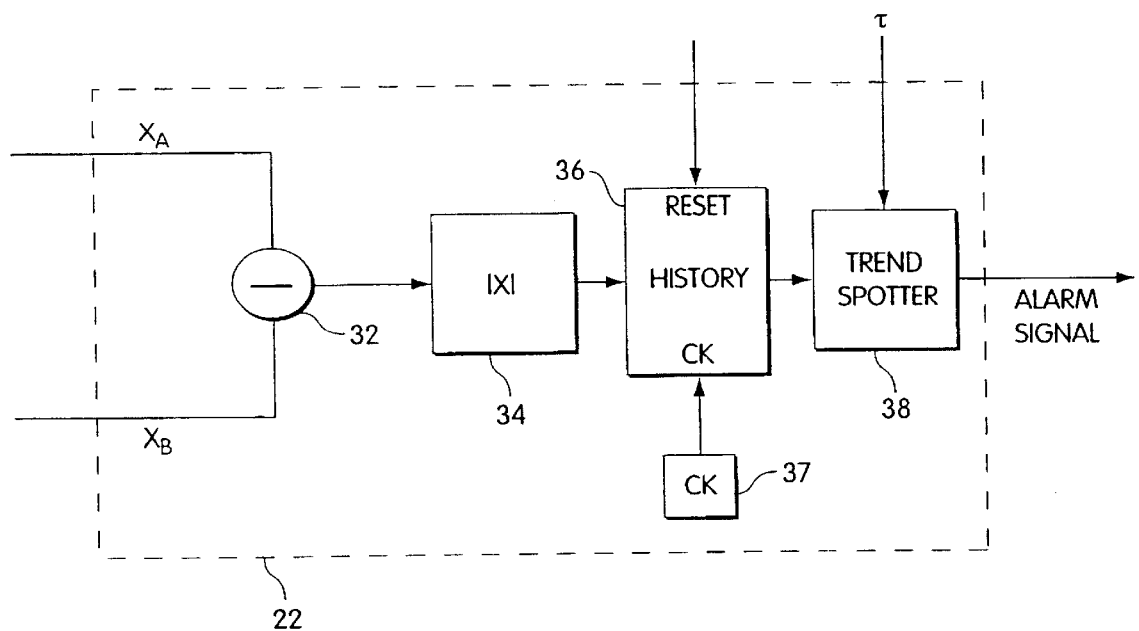
FIG. 2 is an embodiment of the processor in FIG. 1 in which the error signal is a rectified difference signal generated by evaluating the absolute value of the difference between the reference signal and the measurement signal.

Referring now to FIG. 2, a first embodiment of the processor 22 includes a differencer 32 having input ports for receiving the measurement signal from the measurement sensor 14 and the reference signal from the reference sensor 16. The difference has an output port connected to the input of a rectifier 34 that generates the absolute value of the presented at its input. Hence, the output of the rectifier 34 is a rectified difference signal indicative of the absolute value of the difference between the reference signal and the measurement signal. In this embodiment, the rectified difference signal is used as an error signal. However, in other embodiments described below, the rectified difference signal is subjected to additional signal processing steps to generate the error signal.

With further reference to FIG. 2, a history store 36, typically a read-write memory having a plurality of registers, and further having a gate controlled by a clock 37, is connected to the output of the rectifier 34. At each of a plurality of sample times, the clock 37 increments a register index and opens the gate, thereby permitting the current value of the rectified difference signal to be stored in the next available register of the history store 36. The history store 36 thus holds a time series of values indicative of the evolution of the difference between the reference signal and the measurement signal.

Since the history store 36 has a finite number of registers, the time series is preferably one in which, at each sample time, the oldest value of the rectified difference signal is replaced by the current value of the rectified difference signal. The history store 36 also includes a reset terminal to clear all the registers in the event that the measurement sensor 14 or the reference sensor 16 is replaced or repaired.

The time series from the history store 36 is continuously monitored for the occurrence of a triggering event by a trend-spotter 38, typically implemented as software instructions to be executed by the processor 22. The underlying assumption is that during normal operation, because the reference signal and the measurement signal are correlated, the difference signal has a constant value. A deviation from this constant value is therefore indicative of a possible deterioration in the accuracy of either the measurement sensor 14 or the reference sensor 16. The reference sensor 16, because of its isolation from the hostile environment within the process tank 12, is presumed to be reliable. Hence, a change in the value of the difference signal is presumed to indicate a deterioration in the accuracy of the measurement sensor 14.

In the illustrated embodiment of FIG. 2, a triggering event occurs when the difference signal changes by more than a selected threshold. If this occurs, the trend-spotter 38 causes the processor 22 to send an alarm signal to an alarm unit 26 (see FIG. 1) to indicate to maintenance personnel that the measurement sensor 14 is likely to be malfunctioning, and hence that the system needs maintenance.

Figure 3:
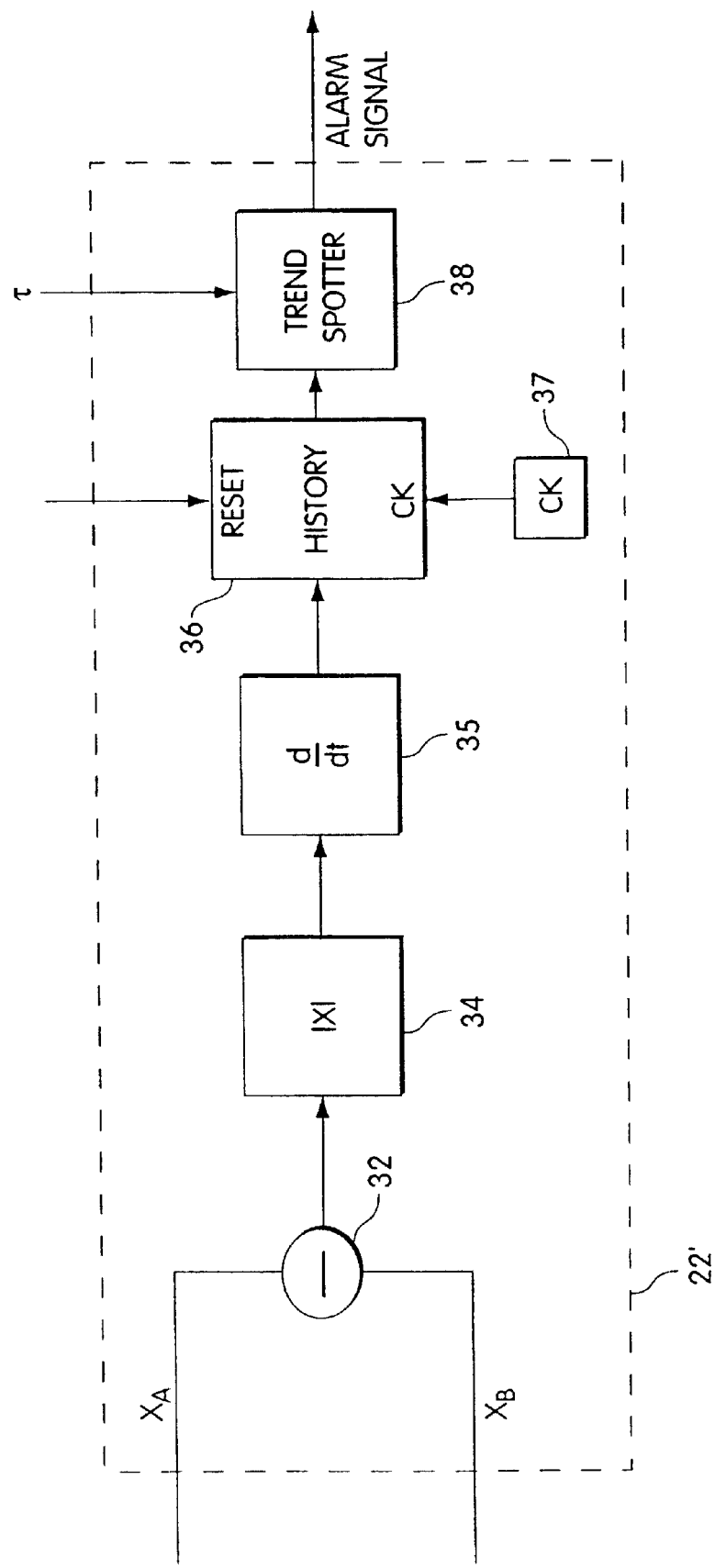
FIG. 3 is an embodiment of the processor in FIG. 1 in which the error signal is the derivative of a rectified difference signal.

In a second embodiment of the processor 22', shown in FIG. 3, the underlying assumption is that because the measurement signal and the reference signal are correlated, the derivative of the difference between the two is normally within a selected interval surrounding zero. To the extent that this derivative is beyond the selected threshold, the measurement sensor 14 may require maintenance. In this second embodiment, a triggering event occurs when the time derivative of the difference signal exceeds the selected threshold. If this occurs, the trend-spotter 38 sends an alarm signal to the alarm unit 26 to indicate to maintenance personnel that the measurement sensor 14 is likely to be malfunctioning. The processor 22 thus includes a differentiator 35 having an input connected to the output of the rectifier 34. The output of the differentiator 35 is then connected to the input of the history store 36.

Figure 4:
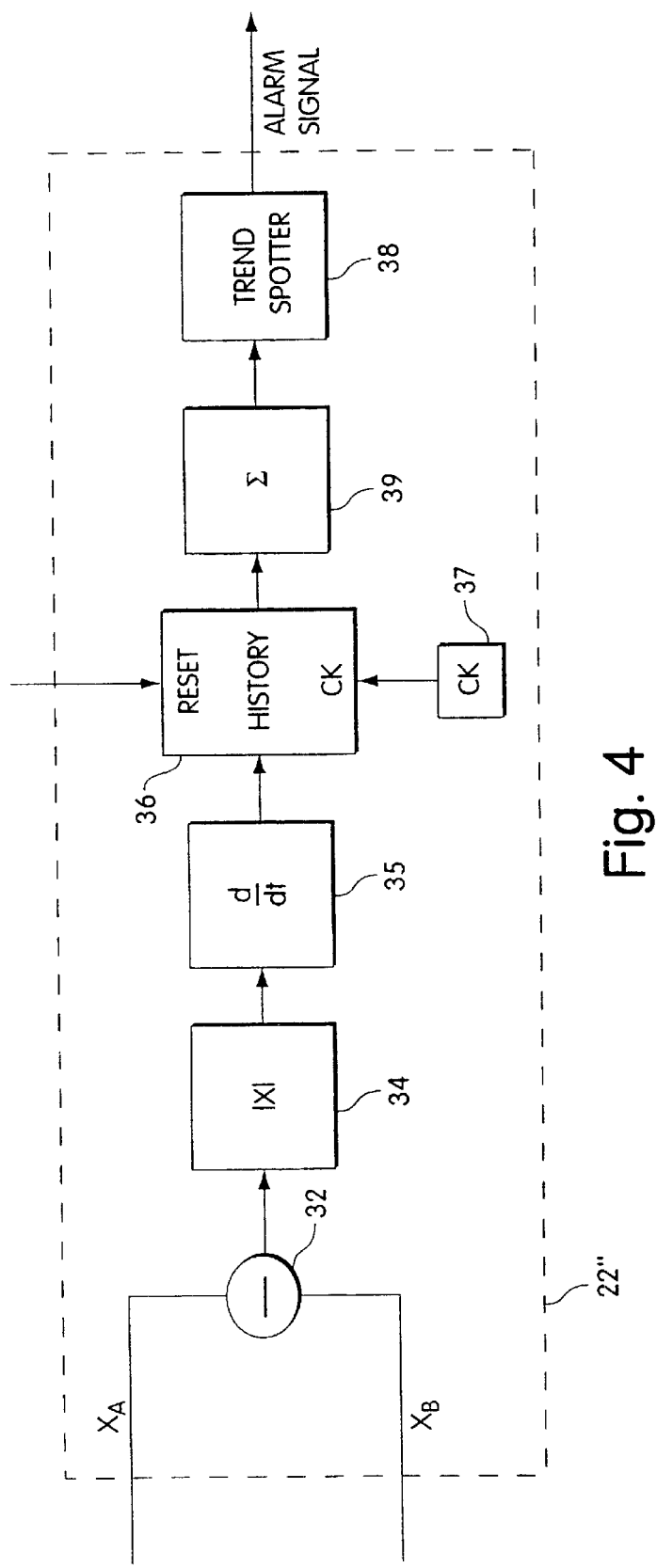
FIG. 4 is an embodiment of the processor in FIG. 1 in which the error signal is the cumulative sum of the error signal in FIG. 3.

In a third embodiment of the processor 22", shown in FIG. 4, the underlying assumption is that if the measurement signal and the reference signal are correlated, the accumulated rate-of-change of the difference signal will be within a selected threshold of zero. To the extent that this quantity is not within the selected threshold of zero, the measurement sensor 14 may require maintenance. In this third embodiment, a triggering event occurs when the accumulated rate of change of the difference signal exceeds the threshold value. If this occurs, the trend-spotter 38 sends an alarm signal to the alarm unit 26 to indicate to maintenance personnel that the measurement sensor 14 is likely to require maintenance. In this embodiment, the output of the history store 36 is connected to the input of a summer 39. The output of the summer 39, which is a signal indicative of the accumulated time-derivatives of the difference signal, is provided to the input of the trend-spotter 38.

Figure 7:
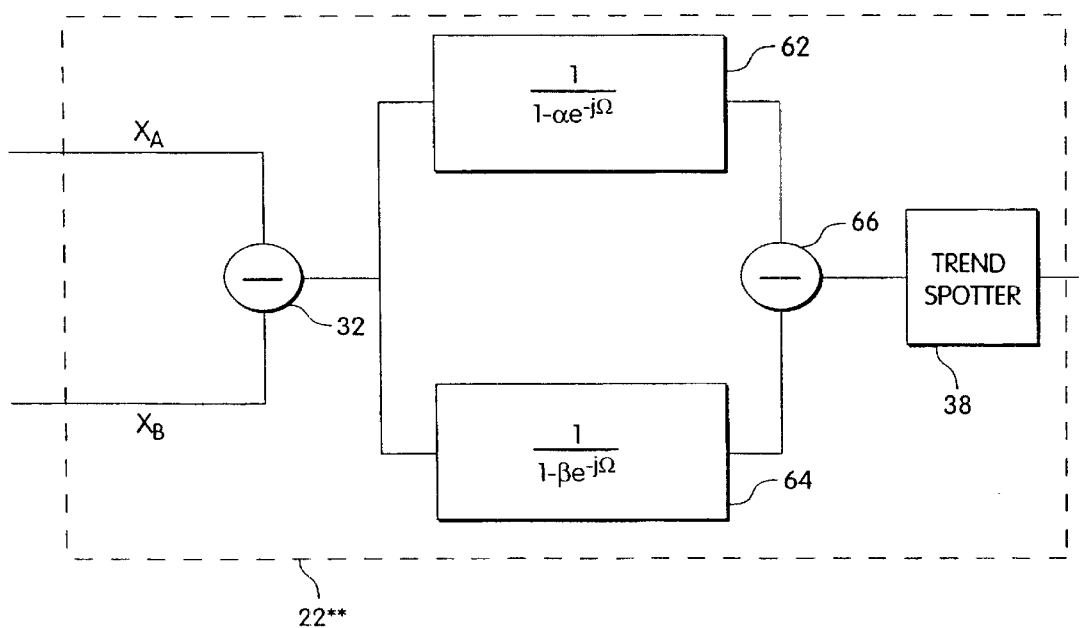
FIG. 7 is a block schematic diagram that shows an embodiment of the processor of FIG. 1 in which the error signal is generated by passing the difference signal through parallel low-pass filters having different time constants.

In a fourth embodiment of the processor 22*, the output of the differencer 32 is connected as shown in FIG. 7. The output of the differencer 32 is filtered by a first low-pass filter 62. The same output of the differencer 32 is also filtered by a second low-pass filter 64 having a time constant different from that associated with the first low-pass filter 62. The outputs from the first and second low-pass filters 62, 64 are then provided as inputs to a second differencer 66. The output of the second differencer 66 is passed to the trend spotter 39.

The underlying assumption for the operation of this fourth embodiment of the processor 22 is that the difference between the outputs of the first and second low-pass filters 62, 64 tends toward zero over time if the reference signal and the measurement signal are tracking each other. If, on the other hand, a sustained or increasing rate-of-change develops between the measurement signal and the reference signal, the difference between the outputs of the first and second low pass filters 62, 64 will be a relatively constant non-zero value or a monotonically changing non-zero value.

In a real system, spurious excursions in the values of both the measurement signal and the reference signal are inevitable. Although they can cause triggering events, many of these excursions are isolated events that are of little value in determining whether the measurement sensor 14 is likely to need maintenance. Accordingly, in order to prevent triggering events caused by such spurious excursions from resulting in alarm signals, it is useful to provide a counter to determine, on the basis of the frequency with which triggering events occur, whether a triggering event indeed warrants an alarm signal.

Figure 5:
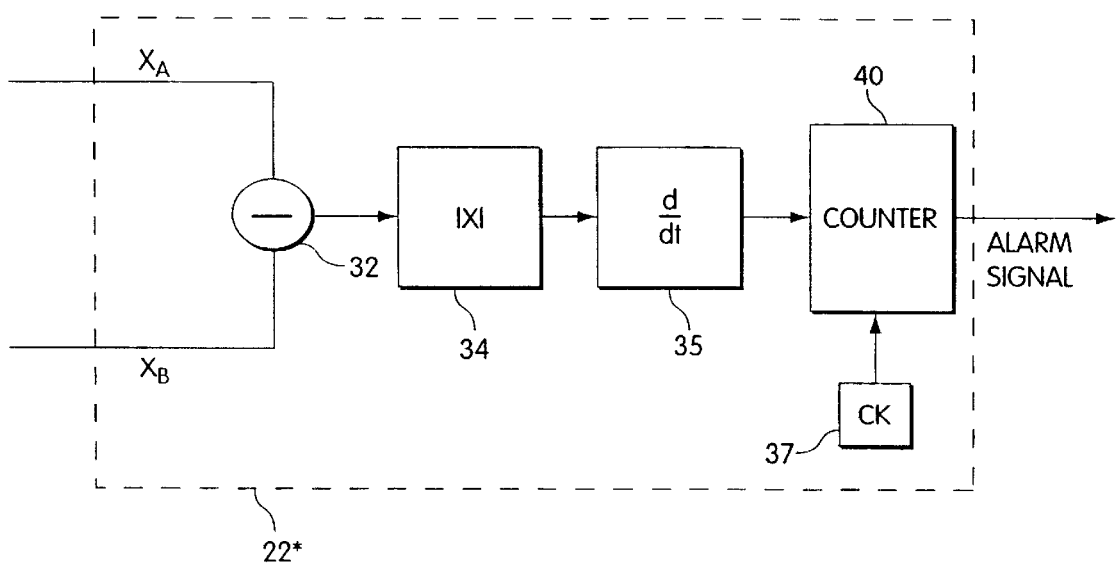
FIG. 5 is a schematic block diagram of the processor of FIG. 3 in which a counter to monitor the error signal suppresses false alarms.

FIG. 5 shows an embodiment of the processor 22** in which a counter 40 under the control of a clock 37 is connected to the output of the differentiator 35 and thereby replaces the history store 36 and the trend-spotter 38 of FIG. 3. It will be understood that, in an analogous manner, the counter 40 can be connected to the output of the rectifier 34 in FIG. 2.

Figure 6:
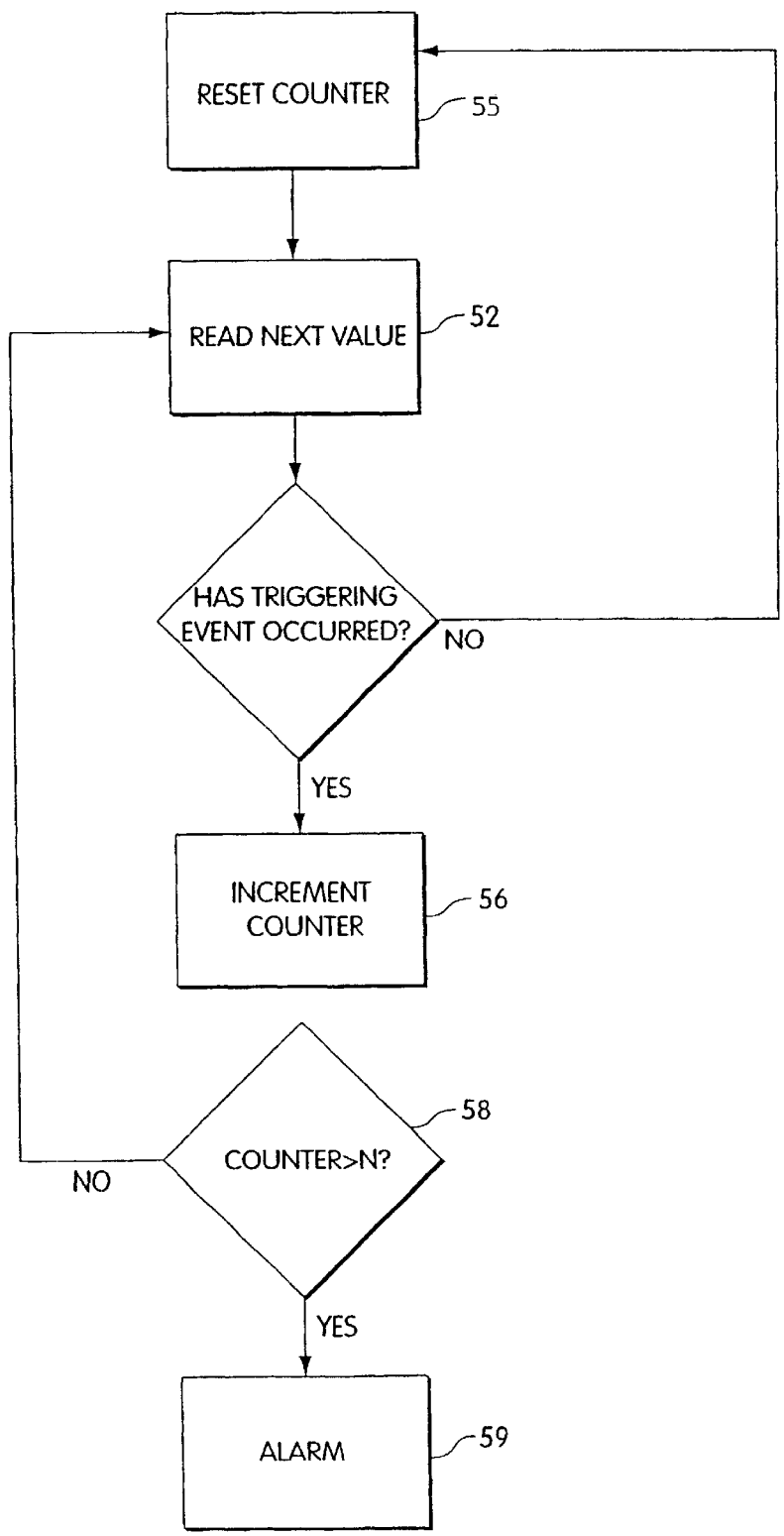
FIG. 6 is a flowchart showing the operation of the counter in FIG. 5.

With reference to the flow chart 50 in FIG. 6, which illustrates the operation of the processor 22** of FIG. 5, at each clock pulse, the counter 40 reads the output of the differentiator 35 (step 52) and determines whether its value is such that a triggering event has occurred (step 54). If no triggering event has occurred, the counter 40 resets a count value to zero (step 55). If a triggering event has occurred, the counter 40 increments the count value (step 56) and checks to see if the count value is in excess of a threshold (step 58). If the count value is in excess of a threshold, the counter 40 transmits an alarm signal to the alarm unit 26 (step 59). Otherwise, the counter waits for the next clock pulse and re-executes the loop by reading the output of the differentiator 35. The threshold with which the count value is compared determines the probability that the sequential occurrence of the triggering event indicates the need for maintenance.

The counter 40 depicted in FIG. 5 can readily be implemented with an eight-bit shift register configured to shift each time a triggering event occurs. In such an embodiment, the threshold referred to above is the value eight. If a triggering event fails to occur at a clock pulse, the shift register is reset. If the shift register becomes full, the counter generates an alarm signal. This alarm signal indicates that the probability that the sequential occurrence of the event indicates a need for maintenance exceeds 99.6 percent.

It will thus be seen that the disclosed method and system efficiently attain the objects set forth above, and those made apparent from the preceding description. Since certain changes may be made in carrying out the above method and in constructing the abover system without departing from the scope of the invention, it is intended that all matter contained in the foregoing description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween Having described the invention and preferred embodiments thereof, that which is claimed as new and secured by Letters Patent is:

1. A method for detecting deterioration in a measurement sensor comprising obtaining a measurement signal from the measurement sensor, obtaining a reference signal from a reference sensor, the reference signal being obtained independently of the measurement signal and being at least partially correlated with the measurement signal, generating an error signal from the measurement signal and the reference signal, and monitoring the error signal to detect deterioration in the measurement sensor.

2. The method of claim 1 wherein generating an error signal comprises generating a difference signal representative of a selected difference between the reference signal and the measurement signal.

3. The method of claim 2 wherein generating an error signal further comprises rectifying the difference signal, thereby generating a rectified difference signal.

4. The method of claim 3 wherein generating an error signal further comprises evaluating a time rate-of-change of the rectified difference signal.

5. The method of claim 4 further comprising evaluating a cumulative sum of values of the time rate-of-change of the rectified difference signal.

6. The method of claim 2 wherein generating an error signal further comprises filtering the difference signal with a first first-order filter having a first time-constant, thereby generating a first filtered output, filtering the difference signal with a second first-order filter having a second time-constant different from the first time-constant, thereby generating a second filtered output, and evaluating a difference between the first filtered output and the second filtered output.

7. The method of claim 1 wherein monitoring the error signal comprises accumulating a time sequence of values of the error signal.

8. The method of claim 1 wherein monitoring the error signal comprises detecting a triggering event.

9. The method of claim 8 wherein detecting a triggering event comprises detecting when a rectified difference between the measurement signal and the reference signal exceeds a threshold.

10. The method of claim 8 wherein detecting a triggering event comprises detecting when a time rate-of-change of a rectified difference between the measurement signal and the reference signal exceeds a threshold.

11. The method of claim 8 wherein detecting a triggering event comprises detecting when an accumulated sum of a plurality of values of a time rate-of-change of a rectified difference between the measurement signal and the reference signal exceeds a threshold.

12. The method of claim 6 wherein monitoring the error signal comprises determining when the value of the difference between the first filtered output and the second filtered output exceeds a threshold.

13. The method of claim 8 further comprising generating an alarm signal in response to the detection of the triggering event.

14. The method of claim 8 further comprising determining a frequency of occurrence of the triggering event, and generating an alarm signal in response to the frequency of occurrence of the triggering event.

15. The method of claim 8 further comprising generating an alarm signal upon the occurrence of a specified number of triggering events.

16. A system for detecting deterioration in a measurement sensor that generates a measurement signal comprising a reference sensor for generating a reference signal independent of the measurement signal and at least partially correlated with the measurement signal, an error signal generator in communication with the reference sensor and the measurement sensor for receiving the reference signal and the measurement signal and generating an error signal therefrom, and a trend-spotter in communication with the error signal generator for detecting the occurrence of a triggering event on the error signal, the triggering event being selected to be indicative of the probability that the measurement sensor requires maintenance.

17. The system of claim 16 wherein the error signal generator comprises a differencer to generate a difference signal from the measurement signal and the reference signal, and a rectifier in communication with the differencer for generating an absolute value of the difference signal.

18. The system of claim 17 further comprising a differentiator in communication with the rectifier for generating a time derivative of the absolute value of the difference signal.

19. The system of claim 18 further comprising a summer in communication with the differentiator for accumulating successive evaluations of a time derivative of the absolute value of the difference signal.

20. The system of claim 17 further comprising a first low-pass filter having a first time constant, the first low-pass filter being in communication with the differencer for generating a first filtered difference signal, a second low-pass filter having a second time constant that differs from the first time constant, the second low-pass filter being in communication with the differencer for generating a second filtered difference signal, and a second differencer in communication with first and second low-pass filters for generating a difference between the first filtered difference signal and the second filtered difference signal.

21. The system of claim 16 further comprising means for accumulating a time of values of the error signal.

22. The system of claim 16 wherein the trend spotter comprises means for detecting a triggering event.

23. The system of claim 22 wherein the means for detecting a triggering event comprises means for detecting when a rectified difference between the measurement signal and the reference signal exceeds a threshold.

24. The system of claim 22 wherein the means for detecting a triggering event comprises means for detecting when a time rate-of-change of a rectified difference between the measurement signal and the reference signal exceeds a threshold.

25. The system of claim 22 wherein the means for detecting a triggering event comprises means for detecting when an accumulated sum of a plurality of values of a time rate-of-change of a rectified difference between the measurement signal and the reference signal exceeds a threshold.

26. The system of claim 20 wherein the trend-spotter comprises means for determining when the value of the difference between the first filtered difference signal and the second filtered difference signal exceeds a threshold.

27. The system of claim 16 wherein the trend-spotter comprises means for generating an alarm signal in response to the occurrence of a triggering event.

28. The system of claim 16 wherein the trend-spotter comprises a counter for determining a frequency of occurrence of triggering event and alarm signal generating means in communication with the counter and for generating an alarm signal in response to the occurrence of a specified frequency of occurrence.

* * * * *